United States Patent
Bondéus et al.

(10) Patent No.: US 12,214,552 B2
(45) Date of Patent: Feb. 4, 2025

(54) FILAMENT FEEDING ADJUSTMENT DEVICE

(71) Applicant: Bondtech AB, Värnamo (SE)

(72) Inventors: Martin Bondéus, Värnamo (SE); Kenneth Skogward, Huskvarna (SE)

(73) Assignee: Bondtech AB, Värnamo (SE)

(*) Notice: Subject to any disclaimer, the term of this patent is extended or adjusted under 35 U.S.C. 154(b) by 944 days.

(21) Appl. No.: 17/224,526

(22) Filed: Apr. 7, 2021

(65) Prior Publication Data
US 2021/0308946 A1   Oct. 7, 2021

(30) Foreign Application Priority Data

Apr. 7, 2020   (SE) .................................... 2050392-6

(51) Int. Cl.
| | | |
|---|---|---|
| *B65H 51/10* | (2006.01) | |
| *B29C 64/118* | (2017.01) | |
| *B29C 64/321* | (2017.01) | |
| *B33Y 30/00* | (2015.01) | |
| *B33Y 40/00* | (2020.01) | |

(52) U.S. Cl.
CPC .......... *B29C 64/321* (2017.08); *B29C 64/118* (2017.08); *B33Y 30/00* (2014.12); *B33Y 40/00* (2014.12); *B65H 51/10* (2013.01); *B65H 2701/313* (2013.01)

(58) Field of Classification Search
CPC ..... B29C 64/321; B29C 64/118; B29C 47/06; B65H 51/10; B65H 2701/31; B65H 2701/313; B65H 49/00; B33Y 30/00; B33Y 40/00
See application file for complete search history.

(56) References Cited

U.S. PATENT DOCUMENTS

| | | | | | |
|---|---|---|---|---|---|
| 3,211,391 A | * | 10/1965 | Scragg | .................. | B65H 51/10 |
| | | | | | 226/176 |
| 4,842,180 A | * | 6/1989 | Kato | ..................... | B65H 9/002 |
| | | | | | 226/176 |

(Continued)

FOREIGN PATENT DOCUMENTS

| | | |
|---|---|---|
| EP | 3009258 A1 | 4/2016 |
| EP | 3501795 A1 | 6/2019 |

(Continued)

*Primary Examiner* — Michael R Mansen
*Assistant Examiner* — Katelynne R Burrell
(74) *Attorney, Agent, or Firm* — Kagan Binder, PLLC

(57) ABSTRACT

A filament feeding device (100) for use in 3D-printing comprising a first feeding wheel (110) configured to rotate with a first rotational shaft (112) and a second feeding wheel (120) configured to rotate with a second rotational shaft (122). The first and second feeding wheels (110, 120) are separated by a separation distance so as to allow feeding of a filament material received between said first and second filament wheels (110, 120). The filament feeding device further comprises an adjuster element (130) movable between a first distinct position (130a) setting said separation distance to a first predetermined distance, and into a second distinct position (130b) setting said separation distance to a second predetermined distance, and wherein said second predetermined separation distance is larger than said first predetermined separation distance. Further, a 3D-printer comprising such a filament feeding device is herein disclosed.

10 Claims, 5 Drawing Sheets

(56) References Cited

U.S. PATENT DOCUMENTS

| | | | |
|---|---|---|---|
| 7,395,952 B2* | 7/2008 | Daniel | B65B 27/12 |
| | | | 226/176 |
| 9,321,609 B2* | 4/2016 | Koop | B29C 64/118 |
| 9,994,418 B2* | 6/2018 | Wu | B65H 51/04 |
| 10,195,784 B2* | 2/2019 | Evans | B29C 64/321 |
| 11,433,611 B2* | 9/2022 | Schroeder | B29C 64/295 |
| 2010/0294823 A1* | 11/2010 | Kirst | B65H 51/10 |
| | | | 226/188 |
| 2014/0159273 A1 | 6/2014 | Koop et al. | |
| 2017/0028623 A1* | 2/2017 | Evans | B29C 70/382 |
| 2019/0099946 A1* | 4/2019 | MacNeish, III | B29C 64/227 |
| 2019/0193331 A1* | 6/2019 | Welling | B33Y 30/00 |
| 2020/0086574 A1* | 3/2020 | Budge | B29C 64/118 |
| 2023/0101979 A1* | 3/2023 | Welling | B33Y 40/00 |

FOREIGN PATENT DOCUMENTS

| | | | |
|---|---|---|---|
| KR | 20080026962 A * | 3/2008 | |
| WO | 2007005236 A1 | 1/2007 | |
| WO | 2008100467 A1 | 8/2008 | |
| WO | 2018170213 A1 | 9/2018 | |
| WO | 2019193369 A2 | 10/2019 | |
| WO | 2019246253 A1 | 12/2019 | |

\* cited by examiner

FILAMENT FEEDING ADJUSTMENT DEVICE

TECHNICAL FIELD OF THE INVENTION

The present disclosure relates to a filament feeding device for use in 3D-printing.

BACKGROUND

In the area of 3D-printing proper feeding of filament is crucial for maintaining an efficient and accurate printing process. As an example, in fused filament fabrication, a string like filament material is fed to a heated printing head which melts the filament and applies the melted filament to the 3D-model under construction. The melted filament material then cools down and transitions back to a solid which forms rigid 3D-structure. The accuracy and speed of the fused filament fabrication process depends in part on how accurately and fast the printing head can be moved and in part on the properties of the filament and how it is fed into the heated head. Filaments may be of different materials, different diameter and feature different hardness and surface properties which ultimately affects the printing and feeding process.

Current solutions utilize a spring-loaded drive wheel or pair of drive wheels that squeezes and feeds filament forward by rotating the drive wheels. Such solutions are adaptable as the same mechanism may be used for filaments with different diameters, hardness or surface properties.

However, a problem with the current solutions is that for some combinations of filament material, diameter and surface properties the drive wheels fails to effectively feed the string like filament. As an example, softer filament materials may be deformed as they pass the drive wheels and filament materials with higher hardness may not be properly fed forward as the drive wheels fail to engage the filament properly.

SUMMARY OF THE INVENTION

In view of the shortcomings of the solutions discussed in the above there is a need for a filament feeding device which may be adapted to effectively and repeatably feed a large variety of different filaments types, and especially filaments of different materials.

It is an object of the present invention to provide an improved and adjustable filament feeding device which may successfully be used for a larger variety of filament types and filament materials while also providing a high level of repeatability.

The invention is defined by the appended independent claims, with embodiments being set forth in the appended dependent claims, in the following description, and in the drawings.

According to a first aspect of the inventive concept, there is provided a filament feeding device for use in 3D-printing, wherein said filament feeding device comprises: a first feeding wheel configured to rotate with a first rotational shaft, a second feeding wheel configured to rotate with a second rotational shaft, wherein said first and second feeding wheels are separated by a separation distance so as to allow feeding of a filament material received between said first and second filament wheels. Wherein said filament feeding device further comprises an adjuster element configured to move said first rotational shaft relative the second rotational shaft by engaging the first rotational shaft with a cam curve slot, the adjuster element being movable between a first distinct position setting said separation distance to a first predetermined distance, and into a second distinct position setting said separation distance to a second predetermined distance, wherein the adjuster element engages the first rotational shaft with a respective first and second position in the cam curve slot in the first and second distinct position respectively, and wherein said second predetermined separation distance is larger than said first predetermined separation distance.

The present invention is at least partly based on the understanding that by setting the distance between the feeding wheels to one of at least two predetermined separation distances the filament feeding device may effectively be adapted to better fit the type of filament material. With the present invention the separation distance between the feeding wheels may be accurately and distinctly set by positioning the adjuster element to one of the at least two distinct positions. Wherein each distinct position is associated with a predetermined separation distance. A user may thus unambiguously determine the separation distance of the feeding wheels from the distinct position of the adjuster element.

As an example, a soft or large diameter filament type may necessitate a larger separation distance so as to avoid deformation of the filament during feeding while a small diameter or filament type with a high hardness may necessitate a smaller separation distance so as to properly engage with the filament during feeding. In other words, the filament feeding device of the present invention allows fine tuning of how the feeding wheels engage the filament. Engaging the filament may comprise at least partially penetrating the filament with the feeding wheels.

Moreover, the filament feeding device according the first aspect of the invention allows a high degree of repeatability as the separation distance may be repeatedly and distinctly set to any of said at least two predetermined separation distances.

In one embodiment the feeding wheels are coaxially arranged with the first and second shaft, respectively. Hereby, the first feeding wheel may rotate with the first shaft and the second feeding wheel may rotate with the second shaft.

The filament feeding device may be adapted to feed a filament type with any diameter, for example by adapting the diameter of the feeding wheels. The filament feeding device may be adapted to feed standard filament types with a diameter of 1.75 mm or standard filament type with a diameter of 2.85 mm.

According to some embodiments the first predetermined separation distance is determined to fit a first filament type and said second predetermined separation distance is determined to fit a second filament type. For any filament type there will be a trade-off in determining the most suitable separation distance for that filament type. The trade-off may lie between deformation of the filament and having the feeding wheels properly engage the filament. The first predetermined separation distance may fit a first type of filament while the second predetermined separation distance may fit a second type of filament. It is possible that one predetermined separation distance is determined to fit two or more filament types. To properly feed a filament material of the first type the adjuster element may preferably be set to the first distinct position, which sets the feeding wheels to the first predetermined separation distance. To properly feed a filament type of the second type the adjuster element may preferably be set to the second distinct position, which sets the feeding wheels to the second predetermined separation distance. Similarly, a distinct position of the adjuster element may be determined to one or more filament types.

The type of filament may in part be determined based on the filament material. As an example, determining which separation distance fits a certain filament material may comprise determining the largest predetermined separation distance which still properly engages a filament of that material. As a further example, determining which separation fits a certain filament material may comprise determining the smallest predetermined separation distance which provides an acceptable level of filament deformation.

Also, different filament types, or filament materials, may feature different surface characteristics. An exemplary surface characteristic is the surface roughness, which also may affect which predetermined separation distance best fits that filament type. A rough surface filament type may not require as small separation distance as a glossy surface filament type requires. Furthermore, different filament types may feature different manufacturing tolerances which may introduce local variations in filament diameter and cross-sectional shape which in turn may affect which separation distance best fits such filament types.

The filament feeding material may be any type of filament material which may be used in a 3D-printing process. The filament material may be any type of plastic, metal, ceramic or biological material suited for 3D-printing. The filament material may for example be chosen from a group including: PVA, Nylon, ABS, ABSi, HDPE, PPSF, PLA, PC, PTFE, PEEK, ASA, HIPS and PETG. The filament material may further be a mix of two or more materials, such as for example a mix of a metal powder with a suitable binding material.

According to some embodiments the first and second feeding wheels are mechanically coupled to said first and second rotational shafts.

A rotational shaft mechanically coupled to each feeding wheel may allow facilitated construction and design of the filament feeding device. The filament feeding device may act on a first rotational shaft so as to move the first rotational shaft relative the second rotational shaft. As a feeding wheel is mechanically coupled to each of the rotational shafts the separation distance between the feeding wheels may also change as the first rotational shaft is moved relative to the second rotational shaft.

Also, the adjuster element of the filament feeding device may be adapted to in a first distinct position set the first rotational shaft in a distinct shaft position. The distinct shaft position of the first rotational shaft may then in turn set the separation distance to a first predetermined distance, as the first feeding wheel is mechanically coupled to the first rotational shaft. The adjuster element may be adapted to set the position of the second rotational shaft in a similar way. Additionally, the adjuster element may be adapted to set the position of both the first and second rotational shaft to achieve a corresponding predetermined separation distance between the feeding wheels mechanically coupled to each of the rotational shafts. The feeding wheels and rotational shafts may be made in once piece.

By engaging at least one of the rotational shafts with a cam curve slot provided in the adjuster element, the positioning of at least one of the rotational shafts may be set by shifting the at least one rotational shaft from one position in the cam curve slot to another position in the cam curve slot. The adjuster element may be configured to, in the first distinct position setting, engage one rotational shaft in a first position in the cam curve slot and in the second distinct position setting, engage that rotational shaft in a second position in the cam curve slot. Wherein the layout of the cam curve slot, and the at least two engagement positions, provided in the adjuster element are configured to set the separation distance to the first and second predetermined separation distance in the first and second distinct position respectively. With a cam curve slot, the adjuster element may act as a cam tensioner mechanism which forces the feeding wheels to a predetermined separation distance. The adjuster element may pivot about any point in the filament feeding device or a body comprised in the filament feeding device.

According to some embodiments the adjuster element engages said first rotational shaft with said cam curve slot and said second rotational shaft is rotationally fixated to said adjuster element.

The second rotational shaft may constitute the pivot point or fulcrum point of the adjuster element. An adjuster element which engages the first rotational shaft with a cam curve slot and is rotationally fixated around the second rotational shaft may mechanically force the rotational shafts into the respective distinct shaft positions when the adjuster element is in a distinct position. As the rotational shafts are mechanically coupled to a respective feeding wheel, the separation distance may thus be simultaneously forced into one of the predetermined distances.

According to some embodiments the first feeding wheel is mechanically coupled to:
 a first drive gear, and
 wherein said second feeding wheel is mechanically coupled to:
 a second drive gear,
 wherein said first and second drive gear are configured to engage each other such that said first and second feeding wheel are rotationally coupled.

Rotationally coupling the feeding wheels has the added benefit that both feeding wheels will rotate substantially synchronized with each other. Should one feeding wheel momentarily disengage from the filament material, that feeding wheel will continue to rotate as long as the other feeding wheel is rotating. It is understood that the feeding wheels rotate in different directions, such as is suited for feeding a filament received between the feeding wheels.

Alternatively and/or additionally, the first and second drive gear may be mechanically coupled to each of the drive wheels by the first and second rotational shaft. In such embodiments the first and second rotational shaft further comprises the first and second drive gear respectively, wherein said first and second drive gear are configured to engage each other such that said first and second rotational shaft are rotationally coupled. By rotationally coupling the first and second rotational shaft via a drive gear provided on each rotational shaft the rotation of the first and second feeding wheel may also be rotationally coupled. Should active driving of one of the feeding wheels, rotational shafts, or drive gears be provided by driving means both feeding wheels will rotate synchronously with engaging first and second drive gears.

According to some embodiments the filament feeding device further comprises at least one driving means mechanically coupled to at least one of said first and said second feeding wheels.

The rotation of at least one the feeding wheels may be actively driven by at least one driving means. Actively driving the rotation of at least one of the driving wheels brings the added benefit that the feeding material may be fed at an appropriate rate. The driving means may be directly coupled to either or both of the feeding wheels. The driving means may be indirectly coupled to the feeding wheels. As an example, the driving means may be coupled to either or both of the first and second rotational shaft which are then mechanically coupled to the first and second feeding wheel respectively.

In an exemplary embodiment the driving means is indirectly rotationally coupled to the feeding wheels by a gear assembly. An exemplary gear assembly comprises a primary drive gear, mechanically coupled to the driving means, wherein the primary drive gear is in mechanically coupled to either or both of the feeding wheels.

The driving means may be a step motor or any other type of electrical motor.

According to some embodiments the filament feeding device further comprises an index spring element, the index spring element (140) is rotatably attached to one of first and second rotational shaft and adapted to abut said adjuster element so as to reliantly hold said adjuster element in said first or said second distinct position.

Reliantly holding the adjuster element in one of the distinct positions means that the predetermined separation distance may be maintained throughout the feeding process. The index spring element has resilient properties such that it may be forced to be released from the adjuster element in the first distinct position, allow the adjuster element to be moved to a second distinct position and reliantly hold the adjuster element in the second distinct position.

Alternatively, a latch lock or pin-and-hole mechanism may be used to reliantly hold the adjuster element in a distinct position while allowing moving of the adjuster element to another distinct position.

According to some embodiments the adjuster element is further adapted to set said separation distance to a number of different predetermined separation distances, wherein said number of different predetermined separation distances is 3, 4, 5, 6, 7, or 8. The adjuster element may further be adapted to be placed in the same number of distinct positions, wherein each distinct position is associated with a separation distance. The different predetermined separation distances may be uniformly spaced and distributed. Multiple predetermined separation distances may allow further fine tuning of how the feeding wheels engage the filament material. Each of the distinct positions of the adjuster element, and thereby each of the predetermined separation distances, may be determined to fit at least one respective filament type.

The difference between a smallest separation distance and a largest separation distance may be in a range of 0.1 mm to 0.7 mm or preferably 0.3 mm to 0.5 mm or most preferably about 0.4 mm. The uniform spacing interval may be determined as the difference in length between the largest and smallest separation distance divided by the number of distinct positions minus one. As an example, with a difference between a smallest separation distance and a largest separation distance of 0.4 mm, the uniform spacing interval between two adjacent predetermined separation distances may be about 0.2 mm should the adjuster element be adapted to set the separation distance to a total of three predetermined distances. Similarly, the uniform spacing interval between two adjacent predetermined separation distances may be about 0.1 mm should the adjuster element be adapted to set the separation distance to a total of five predetermined distances.

According to another aspect of the invention, a 3D-printer comprising a filament feeding device (100) according to any of the preceding embodiments is provided.

A 3D-printer comprising a filament feeding device according to embodiments of the invention has the same feeding related beneficial features as described in the above. The filament feeding device may be external to, or fixated to, a 3D-printer.

BRIEF DESCRIPTION OF THE DRAWINGS

These and other aspects of the present invention will now be described in more detail, with reference to the appended drawings showing exemplary embodiments of the present invention, wherein.

DETAILED DESCRIPTION

In the following detailed description, some embodiments of the present invention will be described. However, it is to be understood that features of the different embodiments are exchangeable between the embodiments and may be combined in different ways, unless anything else is specifically indicated. Even though in the following description, numerous details are set forth to provide a more thorough understanding of the present invention, it will be apparent to one skilled in the art that the present invention may be practiced without these details. In other instances, well known constructions or functions are not described in detail, so as not to obscure the present invention.

Figure 1:
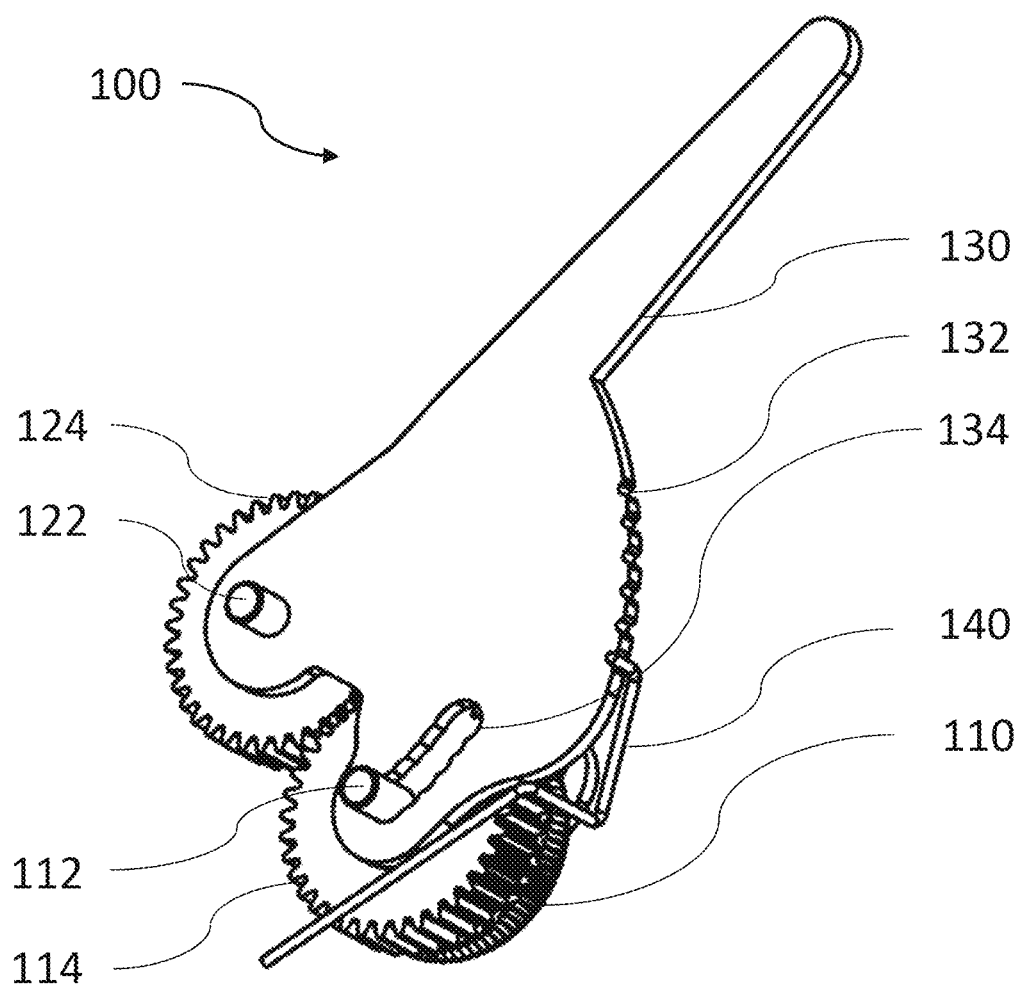
FIG. 1 is a schematic perspective view from a first side of a filament feeding device according to embodiments of the invention.
Figure 2:
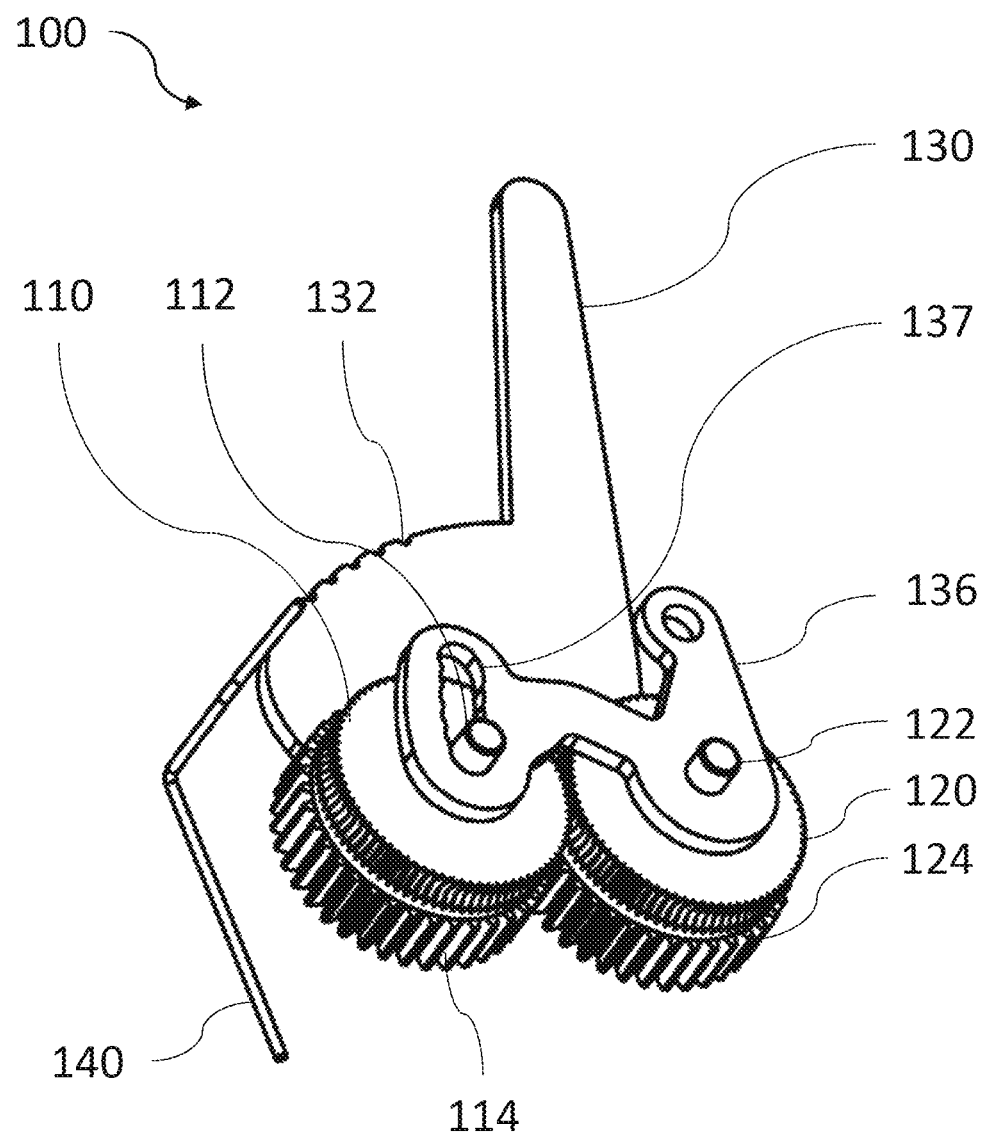
FIG. 2 is a schematic perspective view from a second side of a filament feeding device according to embodiments of the invention.

With reference to FIG. 1 and FIG. 2 there is illustrated an exemplary embodiment of a filament feeding device according to embodiments of the invention. The first feeding wheel (110) and second feeding wheel (120) are each respectively configured to rotate with a first rotational shaft (112) and a second rotational shaft (122). The adjuster element (130) is adapted to in a first distinct position set the separation distance to a first predetermined distance and in a second distinct position set the separation distance to a second predetermined separation distance. The adjuster element (130) may be configured to set a predetermined separation distance by displacing the first feeding wheel (110) only, the second feeding wheel (120) only or both feeding wheels (110, 120) relative to a fixed point in the filament feeding device (100), such as a fixed point on a filament feeding device body.

The adjuster element (130) may be moved by pivoting between the first and second distinct positions. Alternatively, the adjuster element (130) may be configured to be slidable, such that the adjuster element (130) may slide between at least a first and second distinct position and in similar way set the separation distance to a first and second predetermined distance.

In some embodiments of the invention the adjuster element (130) may be provided with an elongated lever portion, an action lever, adapted to be manoeuvred by a user for setting the adjuster element (130) to said first or said second position.

In some embodiments of the invention each first and second feeding wheel (110, 120) is mechanically coupled to a respective first and second rotational shaft (112, 122). In such embodiments the distinct positions of the adjuster element (130) may be configured to set a shaft separation distance, between the first and second rotational shaft (112, 122) to a first or second predetermined shaft distance, which in turn will set the separation distance between the feeding wheels (110, 120) to a corresponding first or second predetermined distance. The adjuster element (130) may be configured to set a shaft separation distance by displacing the first rotational shaft (112) only, the second rotational shaft (122) only or both rotational shafts (112, 122) relative to a fixed point in the filament feeding device (100). The first and second rotational shaft (112, 122) of the filament feeding device (100) may, according to FIG. 1 and FIG. 2, extend in parallel to a first axis, wherein the separation distance between the feeding wheels (110, 120) lies in a plane perpendicular to the first axis.

The adjuster element (130) may engage at least one of the first and second rotational shaft (112, 122) with a cam curve slot (134) provided in the adjuster element (130). Thus, the adjuster element (130) may be pivoted around a pivot point to alter in what cam curve slot position at least one of the first and second rotational shaft (112, 122) engages. The adjuster element (130) and the cam curve slot (134) comprised therein are preferably adapted to mechanically link one distinct position of the adjuster element (130) to one cam curve slot position to one predetermined distance between the feeding wheels (110, 120). The pivot point of the adjuster element may be any point, for example the pivot point of the adjuster element may be provided in a body comprised in the filament feeding device (100) or the pivot point may be constituted by one of the first and second rotational shafts (112, 122). It is perceivable that the adjuster element (130) may comprise one cam slot for each rotational shaft (112, 122), in such embodiments the adjuster element (130) may be slidable to alter the separation distance between the rotational shafts (112, 122), and thereby separation distance of the feeding wheels (110, 120).

The filament feeding device (100) may further comprise an index spring element (140) adapted to reliantly hold the adjuster element (130) in any of the at least two distinct positions. The index spring element (140) may be rotationally anchored to a feeding wheel (110, 120) or a rotational shaft (112, 122) or anchored to a body comprised in the filament feeding device (100). Alternatively, the index spring element (140) may be fixated by other means such that the adjuster element (130) may be moved between the distinct states while also moving relative to the index spring element (140). In some embodiments the adjuster element (130) is provided with indentations (132) adapted to receive the index spring element (140) when said adjuster element (130) is in a distinct position. Preferably, the adjuster element (130) comprises one indentation (132) for receiving the index spring element (140) for each distinct position of the adjuster element (130) and the corresponding predetermined separation distances. The adjuster element (130) and the indentations (132) comprised therein are preferably adapted to together with the index spring element (140) link one distinct position of the adjuster element (130) to one indentation (132) for receiving the index spring element (140) and one predetermined distance between the feeding wheels (110, 120). The adjuster element (130) is preferably mechanically coupled to said feeding wheels (110, 120) such that the difference in separation between two predetermined separation distance is not necessarily reflected in the difference in separation between the two corresponding indentations (132) where the index spring element (140) reliantly holds the adjuster device (130).

The filament feeding device may in some embodiments comprise a supporting adjuster element (136) adapted to, together with the adjuster element (130), in a first supporting distinct position set the separation distance to the first predetermined distance and in a second supporting distinct position set the separation distance to the second predetermined distance. The supporting adjuster element (136) may comprise a cam curve slot (137) which is adapted to engage at least one of the first and second rotational shafts (112, 122) as a compliment to the cam curve slot (134) of the adjuster element (130) which engages one of said first and second rotational shafts (112, 122). The supporting adjuster element (136) is adapted to cooperate with the adjuster element (130). The supporting adjuster element (136) may be adapted to engage and/or be coupled to either or both of the rotational shafts (112, 122) completely analogous to how the adjuster element (130) engage and/or is coupled to either or both of the rotational shafts (112, 122). The supporting adjuster element (136) may be made in one piece with the adjuster element (130). Alternatively, the supporting adjuster element (136) may be fixated to the adjuster element (130) by any suitable fixating means or be completely separate from the adjuster element (130).

FIG. 2 illustrates a first drive gear (114) mechanically coupled to the first feeding wheel (110) and a second drive gear (124) mechanically coupled to the second feeding wheel (120). The first and second drive gear (114, 124) are configured to engage each other such that the feeding wheels (110, 120), mechanically coupled thereto, are rotationally coupled. In some exemplary embodiments, the first drive gear (114) is mounted on the first rotational shaft (112) and the second drive gear (124) is mounted on the second rotational shaft (122). As the adjuster element (130) according to an aspect of the invention is adapted to directly or indirectly change the separation distance between the feeding wheels (110, 120) and the drive gears (114, 124) are mechanically coupled thereto, the drive gears (114, 124) may preferably be provided with gear teeth providing a sufficient working depth such that the drive gears (114, 124) remain engaged for any of the predetermined separation distances.

In FIG. 2 a predetermined first separation distance between the first feeding wheel (110) and second feeding wheel (120) is visible. The adjuster element (130) is in the associated first distinct position.

Figure 3A:
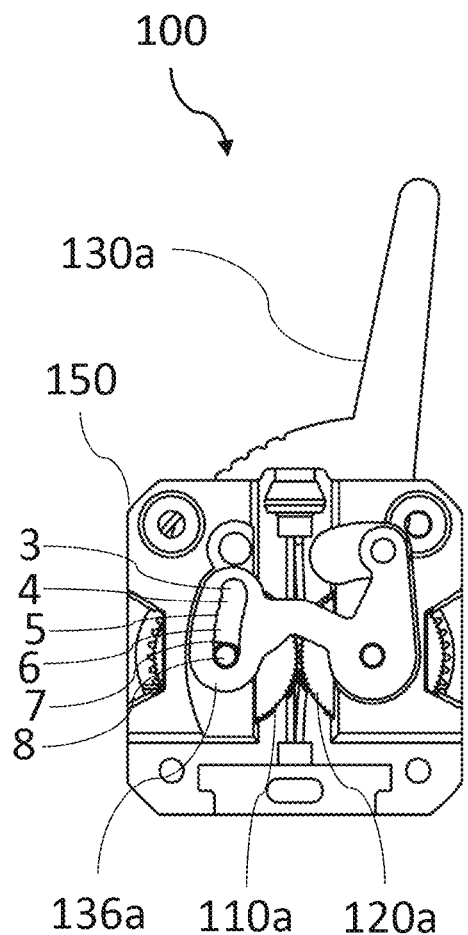
FIG. 3a is cross-sectional view of a filament feeding device according to an aspect of the invention with the separation distance set to a first predetermined distance.
Figure 3B:
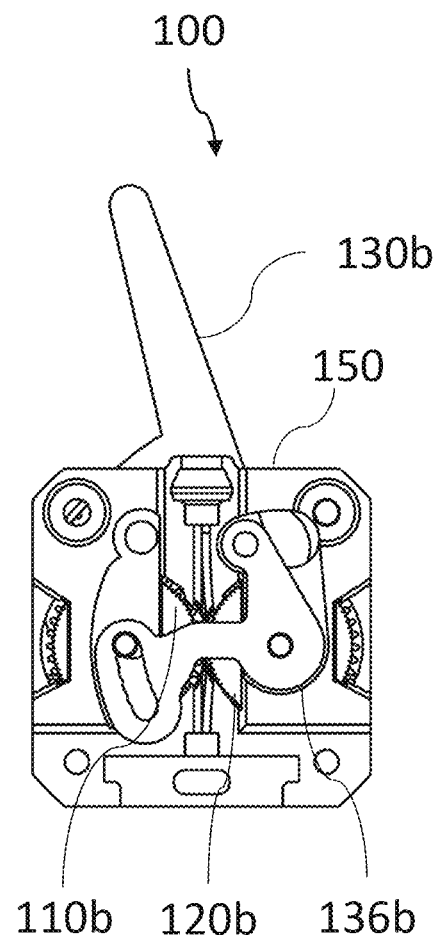
FIG. 3b is a cross-sectional view of a filament feeding device according to an aspect of the invention with the separation distance set to a second predetermined distance.

In FIG. 3a a filament feeding device (100) of the invention is illustrated with the adjuster element (130a) in a first distinct position and in FIG. 3b the same filament feeding device (100) is illustrated with the adjuster element (130a) in a second distinct position. FIG. 3a and FIG. 3b illustrates that the first predetermined separation distance between the first and second feeding wheels (110a, 120a) when the adjuster element is in the first distinct position (130a) is smaller compared to the second predetermined separation distance between the first and second feeding wheels (110b, 120b) when the adjuster element is in the second distinct position (130b). Some embodiments of the filament feeding device (100) further comprise a supporting adjuster element (136a, 136b) adapted to cooperate with the adjuster element (130a, 130b) in any distinct position and during any movement between the distinct positions. As the adjuster element (130a) in first distinct position is moved to a second distinct position (130b) the cooperating supporting adjuster element (136a) in a first distinct position is analogously moved to a second distinct position (136b).

According to FIG. 3a and FIG. 3b the filament feeding device (100) may further comprise a body (150) adapted to hold all the components of the device by means appropriate for the intended function of each component. As an example, the adjuster element (130a, 130b) and supporting adjuster element (136a, 136b) are able to pivot relative to the body (150) so as to set the separation distance to any of the predetermined distances. The feeding wheels (110a, 110b, 120a, 120b) are rotationally coupled to the body (150). One or both of the first and second feeding wheels (110a, 110b, 120a, 120b) are further transversely displaceable relative the body (150).

In an exemplary embodiment, the adjuster element (130a, 130b) is rotationally pivotable around the second rotational shaft (122). The second rotational shaft (122) may then in turn be rotationally fixated to the body (150) while the first rotational shaft (112) is rotationally fixated, and at least in one direction transversely displaceable, relative to said body (150) and engages the adjuster element (130a, 130b) in a cam curve slot. Moreover, the supporting adjusting element (136a, 136b) may preferably be configured to relate in the same to the first and second rotational shaft and the body (150).

Figure 4:
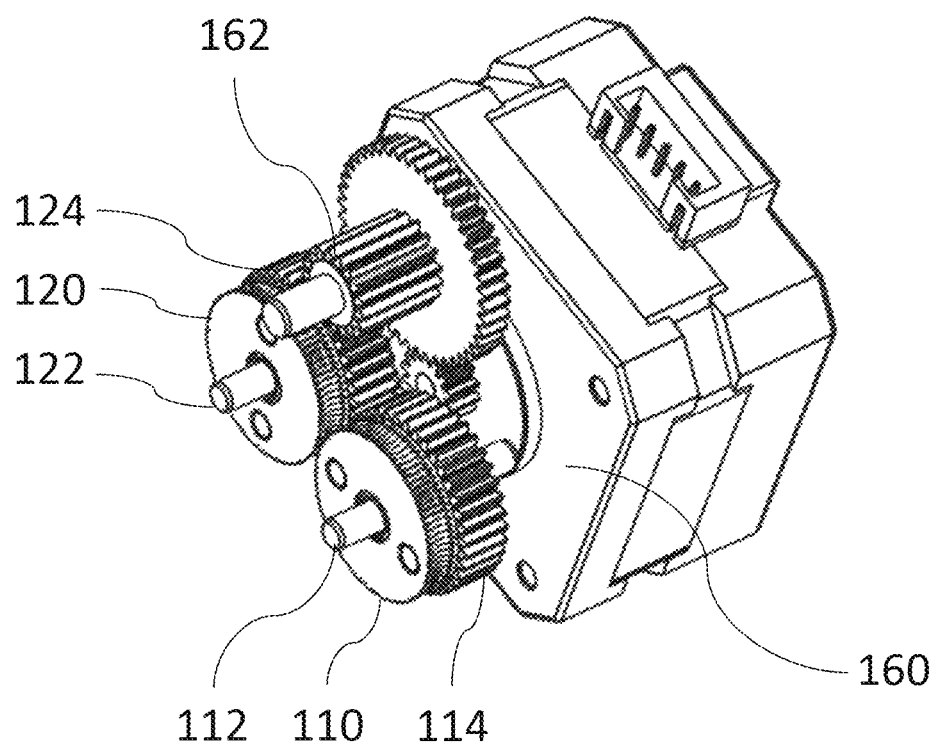
FIG. 4 is a perspective view of a filament feeding device according to an embodiment of the invention.

FIG. 4 illustrates an example of a driving means (160) mechanically coupled to at least one of the first and second feeding wheels (110, 120). The driving means (160) may be directly coupled to at least one of the first and second feeding wheel (110, 120) or the driving means (160) may be indirectly be coupled to at least one of the first and second feeding wheel (110, 120) via a first and/or second rotational shaft (112, 122) mechanically coupled to the first and/or second feeding wheel (110, 120). In an exemplary embodiment the driving means (160) may be coupled to a primary drive gear (162) which is mechanically coupled to at least one of the first and second feeding wheel (110, 120). The driving means (160) may be mechanically coupled to both of the feeding wheels (110, 120) by being mechanically coupled to at least one of the drive gears (114, 124) provided on each rotational shaft (112, 122). The driving means (160) may be comprised in a body comprised in the filament feeding device according to some embodiments of the invention.

Figure 5:
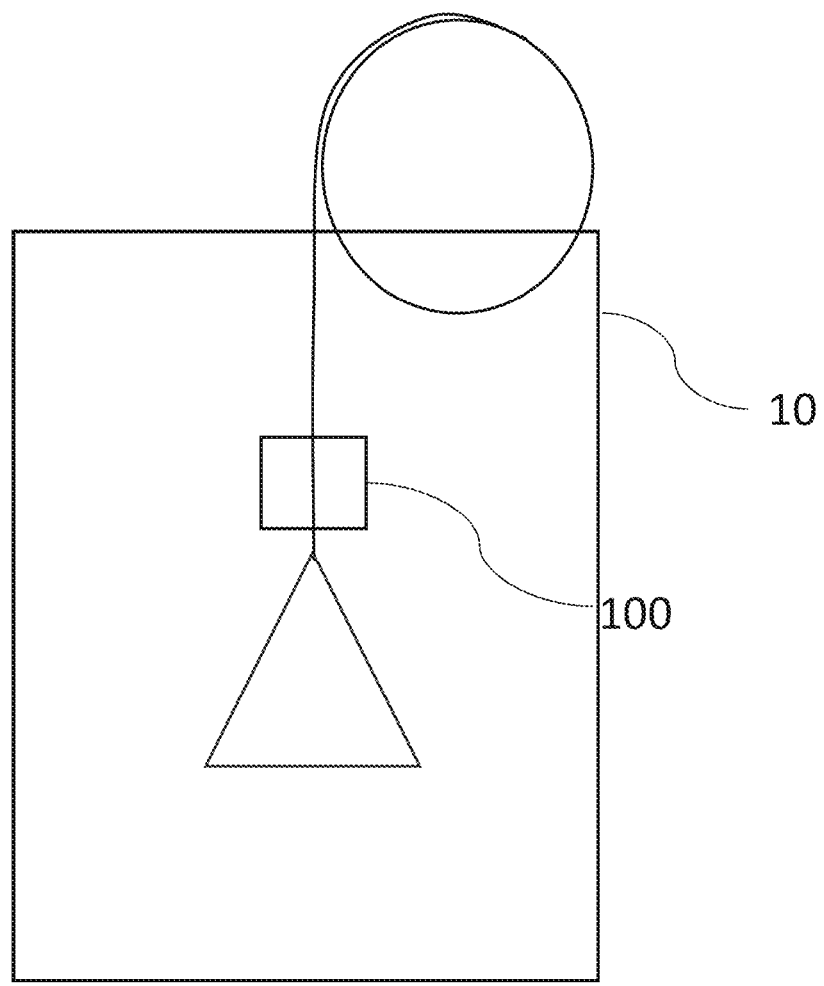
FIG. 5 is a schematic of a 3D printer having a filament feeding device.

FIG. 5 illustrates a 3D-printer (10). The 3D-printer comprises a filament feeding device (100).

With reference to the illustration of the feeding wheels (110, 120) as illustrated in FIG. 1, FIG. 2 and FIG. 4 the feeding wheels (110, 120) may be provided with concave grooves provided along the circumference. The concave grooves may provide facilitated feeding properties as the contacting area against the received filament is increased, compared to a flat surface provided along the circumference. Additionally or alternatively, the feeding wheels (110, 120) may be provided with teeth, provided along the circumference, adapted to engage the filament. The teeth may to some extent penetrate into the filament when the feeding wheels are set in a predetermined separation distance.

The skilled person in the art further realizes that the present invention by no means is limited to the embodiments described above. The features of the described embodiments may be combined in different ways, and many modifications and variations are possible within the scope of the appended claims. In the claims, any reference signs placed between parentheses shall not be construed as limiting to the claim.

The word "comprising" does not exclude the presence of other elements or steps than those listed in the claim. The word "a" or "an" preceding an element does not exclude the presence of a plurality of such elements.

The invention claimed is:

1. A filament feeding device for use in 3D-printing, wherein said filament feeding device comprises:
   a first feeding wheel configured to rotate with a first rotational shaft,
   a second feeding wheel configured to rotate with a second rotational shaft,
   wherein said first and second feeding wheels are separated by a separation distance so as to allow feeding of a filament material received between said first and second filament wheels,
   and wherein said filament feeding device further comprises an adjuster element configured to move said first rotational shaft relative the second rotational shaft by engaging the first rotational shaft with a cam curve slot, the adjuster element being movable between a first distinct position setting said separation distance to a first predetermined distance, and into a second distinct position setting said separation distance to a second predetermined distance, wherein the adjuster element engages the first rotational shaft with a respective first and second position in the cam curve slot in the first and second distinct position respectively, and wherein said second predetermined separation distance is larger than said first predetermined separation distance, wherein said adjuster element engages said first rotational shaft with said cam curve slot and said adjuster element is pivotable around the second rotational shaft.

2. The filament feeding device according to claim 1, wherein said first predetermined separation distance is determined to fit a first filament type, and said second predetermined separation distance is determined to fit a second filament type.

3. The filament feeding device according to claim 2, wherein said first and second feeding wheels are mechanically coupled to said first and second rotational shafts.

4. The filament feeding device according to claim 1, wherein said first and second feeding wheels are mechanically coupled to said first and second rotational shafts.

5. The filament feeding device according to claim 1, wherein said first feeding wheel is mechanically coupled to:
   a first drive gear, and
   wherein said second feeding wheel is mechanically coupled to:
   a second drive gear,
   wherein said first and second drive gear are configured to engage each other such that said first and second feeding wheel are rotationally coupled.

6. The filament feeding device according to claim 1, wherein said filament feeding device further comprises at least one driving means mechanically coupled to at least one of said first and said second feeding wheels.

7. The filament feeding device according to claim 1, wherein said filament feeding device further comprises an index spring element, the index spring element is adapted to abut said adjuster element so as to reliantly hold said adjuster element in said first or said second distinct position.

8. The filament feeding device according to claim 1, wherein said adjuster element is further adapted to set said separation distance to a number of different predetermined separation distances, wherein said number of different predetermined separation distances is 3, 4, 5, 6, 7, or 8.

9. A 3D-printer comprising a filament feeding device according to claim 1.

10. A method of 3D printing, comprising feeding a filament to a heated printing head with a filament feeding device according to claim 1 in a 3D-printer.

* * * * *